United States Patent [19]

Spindler

[11] Patent Number: 5,710,431
[45] Date of Patent: Jan. 20, 1998

[54] OUTDOOR SCENE SIMULATING APPARATUS FOR TESTING AN INFRARED IMAGING DEVICE

[75] Inventor: Jeffrey William Spindler, Ridgecrest, Calif.

[73] Assignee: The United States of America as represented by the Secretary of the Navy, Washington, D.C.

[21] Appl. No.: 706,588

[22] Filed: Sep. 5, 1996

[51] Int. Cl.$^6$ .................................................. H05B 3/26
[52] U.S. Cl. .................................................. 250/504 R
[58] Field of Search ........................ 250/504 R, 495.1, 250/494.1, 493.1; 273/348.1; 434/21; 428/206, 209, 210; 392/435, 438, 422, 420, 421, 423, 424

[56] References Cited

U.S. PATENT DOCUMENTS

| | | | |
|---|---|---|---|
| 4,317,042 | 2/1982 | Bartell | 250/493 |
| 4,433,924 | 2/1984 | Quinn, III | 374/2 |
| 4,639,603 | 1/1987 | Pistor | 250/504 R |
| 4,864,146 | 9/1989 | Hodges et al. | 250/504 R |
| 4,967,091 | 10/1990 | Fair et al. | 250/504 R |
| 4,975,573 | 12/1990 | Girard | 250/252.1 |
| 5,010,251 | 4/1991 | Grinberg et al. | 250/332 |
| 5,083,252 | 1/1992 | McGuire | 362/293 |
| 5,275,869 | 1/1994 | Lin | 428/195 |
| 5,466,943 | 11/1995 | Green et al. | 250/493.1 |
| 5,594,832 | 1/1997 | Obermeier | 250/504 R |
| 5,602,398 | 2/1997 | Knodle et al. | 250/504 R |

*Primary Examiner*—Kiet T. Nguyen
*Attorney, Agent, or Firm*—Melvin J. Sliwka; David S. Kalmbaugh

[57] ABSTRACT

An outdoor scene simulating apparatus for testing an infrared imaging device comprising an infrared source, which emits infrared energy along a first optical path. Positioned downstream from the infrared source along the first optical path is a metallic substrate which has on its front surface a simulated outdoor scene. The simulated outdoor scene is formed by coating a portion of the metallic substrate with a black ink which absorbs infrared radiation. A thermal mass abuts the substrate to provide a cooling path between the thermal mass and the substrate. The thermal mass cools the metallic substrate and black ink of the simulated outdoor scene to temperatures below ambient temperature reducing infrared emissions from the metallic substrate and black ink of the simulated outdoor scene. Infrared energy reflected from the metallic substrate is directed along a second optical path to a collimator. The collimator collects the infrared radiation reflected from on metallic substrate and then redirects the infrared radiation as a collimated beam of infrared radiation along a third optical path to the lens of the infrared imager being tested.

5 Claims, 2 Drawing Sheets

OUTDOOR SCENE SIMULATING APPARATUS FOR TESTING AN INFRARED IMAGING DEVICE

BACKGROUND OF THE INVENTION

1. Field of the Invention

The present invention relates generally to apparatus for testing an infrared imaging device. More specifically, the present invention relates to an outdoor scene simulating apparatus which presents a simulated outdoor scene to an infrared imaging device to test the infrared imaging device.

2. Description of the Prior Art

A blackbody is an idealized object which may absorb all electromagnetic radiation impacting it or may be considered as a radiation source which is generally heated to increase its radiated energy. The total emission of radiant energy from a blackbody is expressed by the Stefan-Boltzmann law, which states that the total electromagnetic emission of a blackbody is proportional to the fourth power of its absolute temperature. The spectral energy distribution of the radiant energy emitted by a blackbody is expressed by Planck's radiation formula. Planck's radiation formula indicates that a blackbody which has a temperature between about 50 degrees Kelvin and 3,000 degrees Kelvin will emit electromagnetic radiation principally in the infrared region. This temperature range encompasses the temperatures at which most non-nuclear physical phenomena occur.

A blackbody is an idealized concept. A blackbody simulator is a device designed to simulate the physical properties of the idealized blackbody. A blackbody simulator is of great use in infrared research and development as well as manufacturing. For instance, it may be used to provide a source of infrared radiation of a known radiance level and a known spectral distribution. It may be used to provide a source of infrared radiation for the adjustment or testing of infrared components, assemblies or systems.

Presently, blackbody simulators are used to test infrared imaging device such as an infrared camera, an infrared search and track system, an infrared radiometer or infrared missile seeker. The infrared imaging device being tested is generally sensitive to electromagnetic radiation in the 1 to 20 micron wavelength band as opposed to the visible range of the electromagnetic spectrum. An infrared missile seeker or an infrared search and track system compares images from two or more spectral bands within the infrared region to discriminate military targets from neutral backgrounds.

A test configuration 10 used in the past to test an infrared imaging device 22 is illustrated in FIG. 1. Test configuration 10 includes an infrared source 12 for generating and emitting infrared radiation 14 towards a semitransparent slide 16. Infrared source 12 may be, for example, a blackbody infrared radiation source. A portion of the infrared radiation 14 emitted by source 12 passes through semitransparent slide 16 to the lens 20 of an infrared imager 22 under test.

Thermal contrast for testing infrared imagers is generally acceptable in the 3 to 5 micron spectral band, but not at longer wavelengths. Transmissive slides, such as slide 16 in FIG. 1, look "washed out" in the 8 to 12 micron spectral band. There are several reasons for the poor contrast caused by using a transmissive slide to test an infrared imager. Infrared energy from a blackbody source such as source 12 in FIG. 1 is lost to surface reflections and absorption before reaching the front of the transmissive slide. Both the inks and the substrate of the slide provide significant emissions at long wavelengths, while ambient backgrounds reflect off the front surface of the slide.

In addition, apparent temperatures in a transmissive slide are higher than real scene outdoor temperatures because of ambient temperature emission and reflection from the slide, and because the blackbody must be hot to compensate for transmission losses through the slide. Cooling the slide is difficult, since both sides of the slide must be completely unobstructed.

Accordingly, there is a need for an apparatus which will appear to an infrared imaging device as an outdoor scene.

The outdoor scene needs to simulate thermal emissions from the atmosphere, clouds, vegetation, soils, rocks and man made objects such as buildings, highways and the like. The outdoor scene elements will typically have apparent graybody temperatures in the range from about −20 degrees to +50 degrees centigrade. The infrared simulation will need to accurately represent the spectral content and radiance of the outdoor scene elements. The viewpoint of the imager will need to be on the earth's surface or at low altitude flight.

SUMMARY OF THE INVENTION

The present invention overcomes some of the disadvantages of the prior art including those mentioned above in that it comprises a relatively simple yet highly efficient outdoor scene simulating apparatus for testing an infrared imaging device. The outdoor scene simulating apparatus for testing an infrared imaging device comprises an infrared source, which emits infrared energy along a first optical path. The infrared source may be a flat plate type blackbody.

Positioned downstream from the infrared source along the first optical path is a metallic substrate which has on its front surface a simulated outdoor scene. The simulated outdoor scene is formed by coating a portion or parts of the metallic substrate with a black ink which absorbs infrared radiation. Density variations in the ink coating result in parts of the scene appearing cool while other parts of the scene appear warm.

Positioned at the rear surface of the metallic substrate is a thermal mass which abuts the substrate to provide a cooling path between the thermal mass and the substrate. The thermal mass cools the metallic substrate and black ink of the simulated outdoor scene to temperatures below ambient temperature reducing infrared emissions from the metallic substrate and black ink of the simulated outdoor scene.

Infrared energy reflected from the metallic substrate is directed along a second optical path to a collimator which is positioned on the second optical path downstream from the metallic substrate. Collimator collects the infrared radiation reflected from on metallic substrate and then redirects the infrared radiation as a collimated beam of infrared radiation along a third optical path to the lens of the infrared imager being tested.

DETAILED DESCRIPTION OF THE PREFERRED EMBODIMENT

Figure 1:
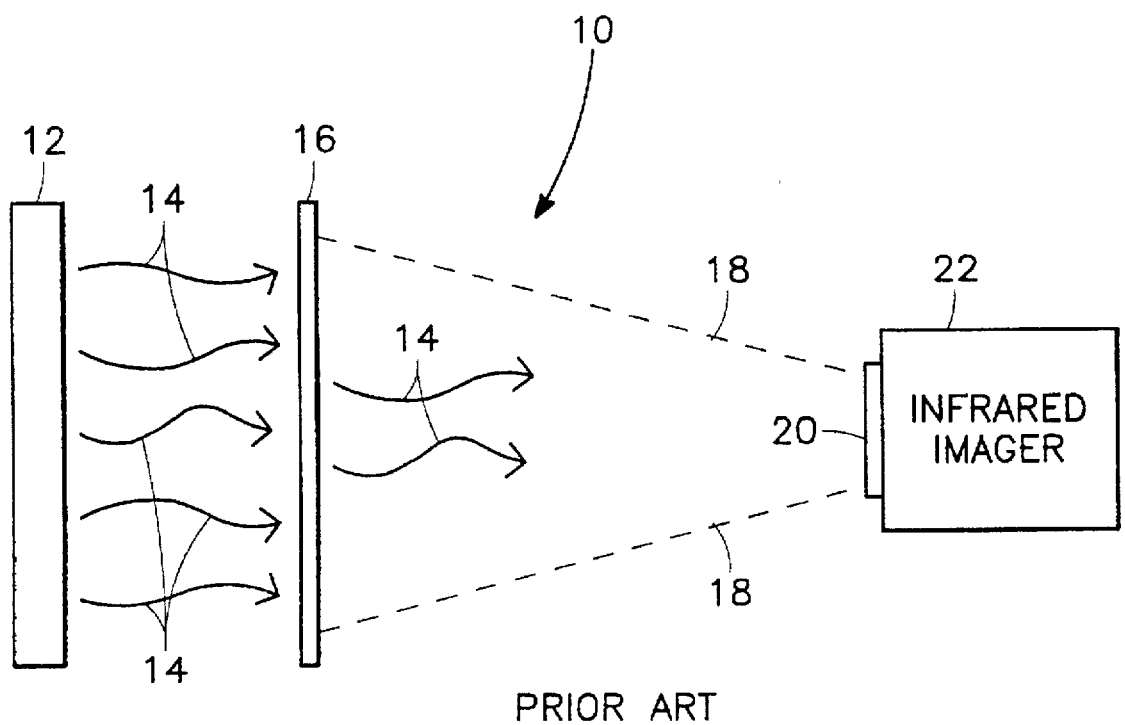
FIG. 1 is a schematic diagram of a prior art infrared scene simulation apparatus for use in testing an infrared imaging device.
Figure 2:
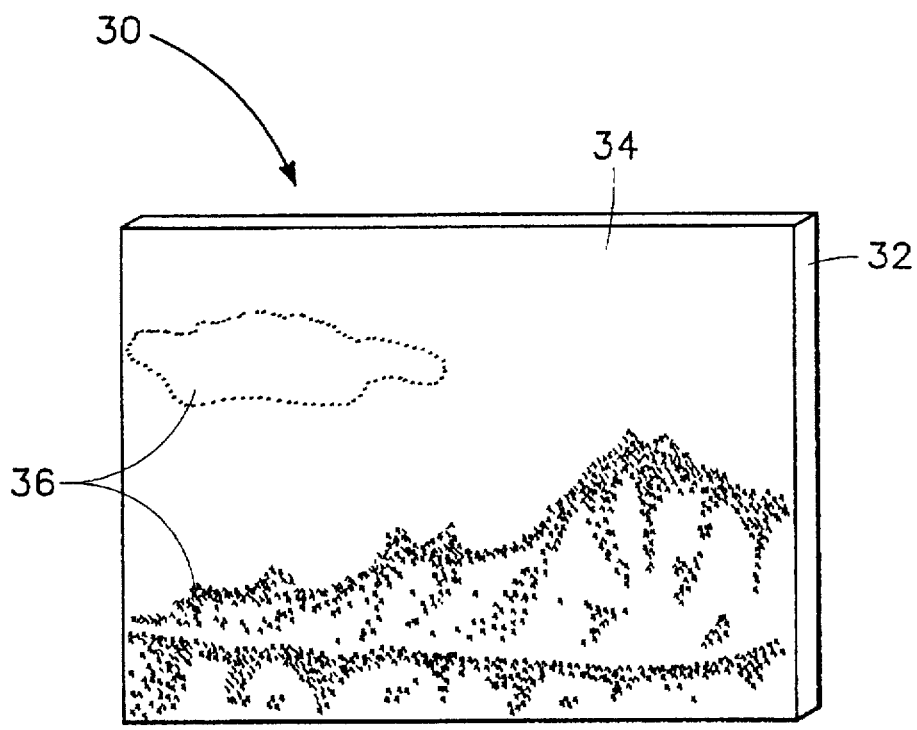
FIG. 2 illustrates a simulated outdoor scene which is used to test an infrared imaging device.
Figure 3:
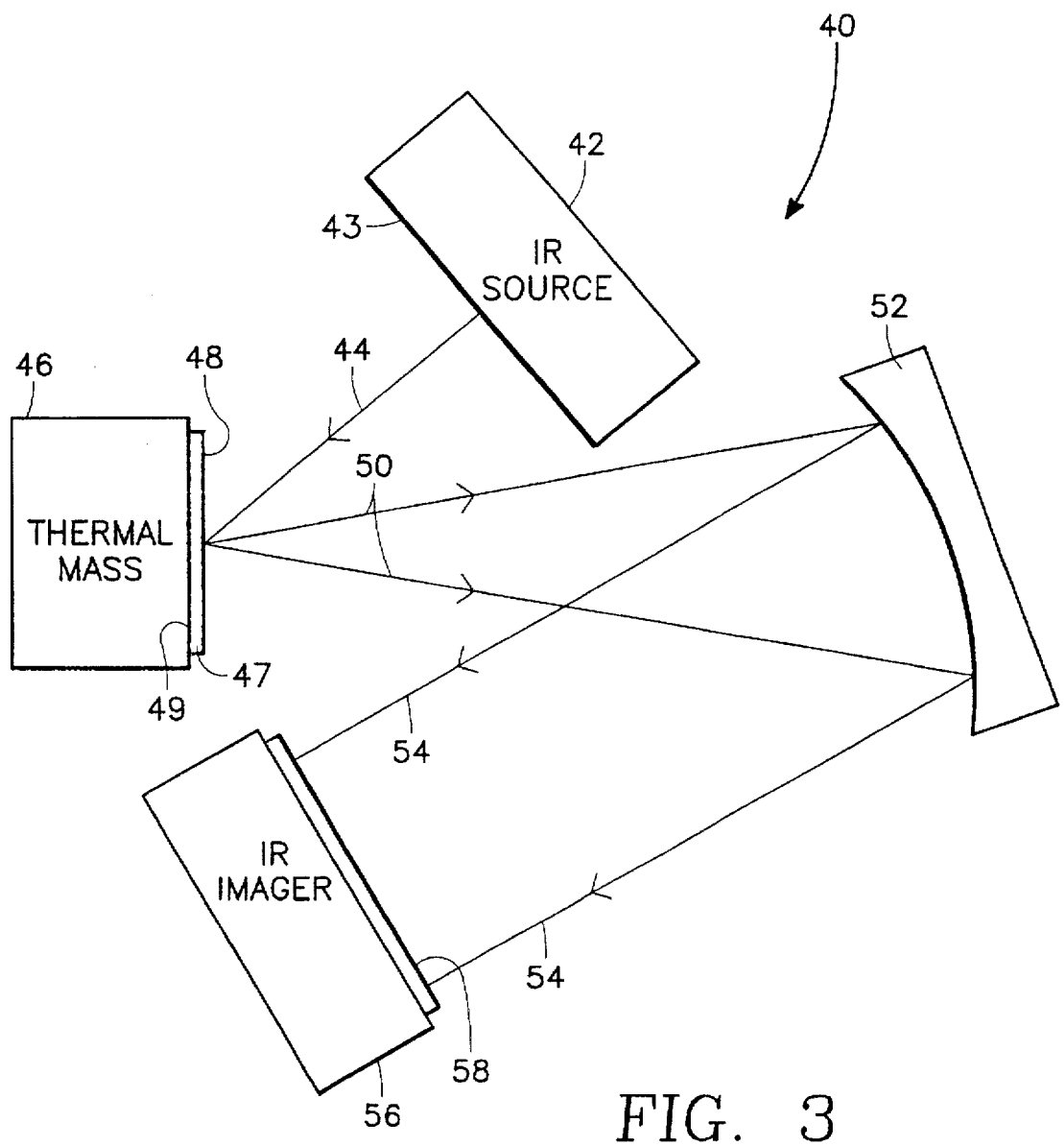
FIG. 3 is a schematic diagram of an outdoor scene simulating apparatus for testing an infrared imaging device which constitutes the preferred embodiment of the present invention.

Referring now to FIGS. 2 and 3, there is shown a outdoor scene simulating apparatus (designated generally by the reference numeral 40) for testing an infrared imager 56. The infrared imager 10 under test may be an infrared camera, an infrared search and track system, an infrared radiometer or an infrared missile seeker. Infrared imaging device 10 is generally sensitive to electromagnetic radiation in some part of the 1 to 20 micron wavelength band of the electromagnetic spectrum. When infrared imaging device 10 is an infrared imaging system or an infrared search and track system, it compares images from at least two spectral bands within the infrared to discriminate military targets from the natural background of an outdoor scene such as the outdoor scene illustrated in FIG. 2.

Outdoor scene simulation apparatus 40 comprises an infrared source 42 which emits infrared radiation or energy 44 along a first optical path. Infrared source 42 is preferably a commercially available flat plate type blackbody having a large surface area of from 10 to 50 cm across. Infrared source 42 may be fabricated from aluminum plate with the front surface 43 of infrared source 42, which emits infrared radiation, being coated with a black paint. An electrical resistance heater (not illustrated) is imbedded within infrared source 42 to raise its temperature above ambient to about 200 degrees centigrade.

Positioned downstream from infrared source 42 along the first optical path is a metallic substrate 47 which infrared energy 44 emitted by infrared source 42. Metallic substrate 47 has on its front surface 48 a simulated outdoor scene 30 which is illustrated in FIG. 2. The front surface 48 of metallic substrate 47 is relatively flat with a roughness of less than 0.5 mm to provide for an approximately spectral reflection of incoming infrared energy. The body of metallic substrate 47 is generally rigid supporting its own weight and is heat conductive. Front surface 48 of metallic substrate 47 is highly reflective with a reflectance greater than 0.85 across the infrared spectrum.

As is best illustrated in FIG. 2 the simulated outdoor scene 30 of metallic substrate 32 includes a portion thereof covered with black ink or paint (designated generally by the reference numeral 36) to provide for reflectance variations across simulated outdoor scene 30. The portion of scene 30 designated by reference numeral 34 represents a clear background such a as cloudless sky and does not include black ink or paint.

Black ink 32 of simulated outdoor scene 30 absorbs infrared energy with reflectance variations from scene 30 being provided by varying the thickness of the ink layer of black ink 32 or by varying the spacing between the ink dots of black ink 32.

Positioned at the rear surface 49 of substrate 47 is a thermal mass 46 which abuts the rear surface 49 of substrate 47 to provide for a cooling path between thermal mass 46 and substrate 47. Thermal mass 46 cools metallic substrate 47 and black ink 36 of simulated outdoor scene 30 to temperatures below ambient temperature reducing infrared emissions from metallic substrate 47 and black ink 36 of scene 30. When front surface 48 of metallic substrate 47 is at a cool temperature, which is generally in the range of –40 to +10 degrees centigrade, black ink 36 of scene 30 accurately simulates cooled temperatures such as a cooled sky on a cool day.

It should be noted that thermal mass 46 also prevents metallic substrate 47 and black ink 36 from warming as metallic substrate 47 and black ink 36 absorb infrared energy 44 from infrared source 42. It should also be noted that any commercially available black ink which is a high absorption, low reflectance ink may be used as the black ink of simulated outdoor scene 30.

Positioned downstream from metallic substrate 47 along a second optical path is a collimator 52. Infrared radiation 50 reflected from simulated outdoor scene 30 on substrate 47 is directed toward a collimator 52. Collimator 52 collects the infrared radiation 50 reflected from the outdoor scene 30 on metallic substrate 47 and then redirects the infrared radiation (now designated by the reference numeral 54) as a collimated beam of infrared radiation along a third optical path to the lens 58 of the infrared imager 56 being tested. Collimated beam 54 comprises a plurality of substantially parallel rays of infrared energy.

The collimated beam of infrared energy 54 received by the infrared imager 56 being tested simulates an outdoor scene with the appearance of varying temperatures caused by the variations in thickness of the ink layer of black ink 32 on scene 30 and by the spacing variations between ink dots of black ink 32 on scene 30.

A laboratory environment was utilized to demonstrate the outdoor scene simulating apparatus 40 of FIG. 3. The infrared imager 56 selected to demonstrate outdoor scene simulating apparatus 40 was a Magnavox Two Color Imaging Radiometer. This radiometer responds to two spectral bands which are 3 to 5 microns and 8 to 12 microns, has a 10 degree field of view, and can measure apparent temperatures in an infrared scene such as the simulated outdoor scene 30 of FIG. 2.

The substrate 47 selected to demonstrate apparatus 40 was 3M Company's "DAMARK" picture stock which is a material fabricated of 0.5 mm thick sheet aluminum. The front surface of the "DAMARK" picture stock is precoated with black ink. The black ink on the picture stock was exposed to ultraviolet light through a photographic transparency of an outdoor picture. The exposed areas were next etched away using ammonia as the solvent. This resulted in a black ink on aluminum reproduction of the picture which function as simulated outdoor scene 30 during the demonstration of apparatus 40. "DAMARK" also has adhesive on its back side, which allows for excellent thermal contact with thermal mass 46.

The thermal mass 46 selected to demonstrate apparatus 40 was an aluminum plate set to a temperature of about 20 degrees Centigrade. The infrared source 42 selected to demonstrate apparatus 40 was a commercially available 30 cm flat plate type blackbody set to a temperature of about 99 degrees Centigrade.

Test results from the laboratory demonstration of apparatus 40 indicate that maximum temperature contrast in the 3 to 5 micron band was 40 degrees Centigrade and maximum temperature contrast in the 8 to 12 micron band was 30 degrees Centigrade.

From the foregoing, it may readily be seen that the present invention comprises a new, unique and exceedingly useful outdoor scene simulating apparatus for testing an infrared imaging device which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed is:

1. An apparatus for testing an infrared imaging device which is sensitive to electromagnetic radiation in a three micron to twelve micron wavelength band, said apparatus comprising:

a blackbody for generating and emitting infrared energy along a first optical path, said infrared energy having a wavelength in a range of between about three microns and about twelve microns;

a metallic substrate positioned downstream from said blackbody on said first optical path, said metallic substrate having a front surface and a rear surface, the front surface of said metallic substrate having a portion thereof coated with an infrared absorbing black ink to simulate thermal emissions from an outdoor scene, the front surface of said metallic substrate reflecting a substantial portion of said infrared energy incident upon the front surface of said metallic substrate, the front surface of said metallic substrate providing a reflecting rate greater than 0.85;

a thermal mass positioned at the rear surface of said metallic substrate, said thermal mass abutting the rear surface of said metallic substrate to cool said metallic substrate; and a collimator positioned on a second optical path downstream from said metallic substrate, said collimator collecting said infrared energy reflected from the front surface of said metallic substrate, said collimator forming a collimated beam of infrared energy from said infrared energy collected by said collimator, said collimator directing said collimated beam of infrared energy along a third optical path to said infrared imaging device being tested.

2. The apparatus of claim 1 wherein said blackbody comprises a flat plate blackbody.

3. The apparatus of claim 1 wherein said metallic substrate is fabricated from aluminum sheet having a thickness of approximately 0.5 millimeters.

4. The apparatus of claim 1 wherein said thermal mass comprises an aluminum plate set to a temperature of about twenty degrees Centigrade.

5. An apparatus for testing an infrared imaging device which is sensitive to electromagnetic radiation in a three micron to twelve micron wavelength band, said apparatus comprising:

a flat plate blackbody for generating and emitting infrared energy along a first optical path, said infrared energy having a wavelength in a range of between about three microns and about twelve microns;

said flat plate blackbody comprising a thirty centimeter flat plate blackbody;

a metallic substrate positioned downstream from said blackbody on said first optical path, said metallic substrate having a front surface and a rear surface, the front surface of said metallic substrate having a portion thereof coated with an infrared absorbing black ink to simulate thermal emissions from an outdoor scene, the front surface of said metallic substrate reflecting a substantial portion of said infrared energy incident upon the front surface of said metallic substrate, the front surface of said metallic substrate providing a reflecting rate greater than 0.85;

said infrared absorbing black ink having a density which varies across the front surface of said metallic substrate;

said metallic substrate being fabricated from aluminum sheet having a thickness of approximately 0.5 millimeters;

a thermal mass positioned at the rear surface of said metallic substrate, said thermal mass abutting the rear surface of said metallic substrate to cool said metallic substrate;

said thermal mass comprising an aluminum plate set to a temperature of approximately twenty degrees centigrade; and a collimator positioned on a second optical path downstream from said metallic substrate, said collimator collecting said infrared energy reflected from the front surface of said metallic substrate, said collimator forming a collimated beam of infrared energy from said infrared energy collected by said collimator, said collimator directing said collimated beam of infrared energy along a third optical path to said infrared imaging device being tested.

\* \* \* \* \*